US008179675B2

(12) United States Patent
Lo

(10) Patent No.: US 8,179,675 B2
(45) Date of Patent: May 15, 2012

(54) COMPUTER CASE WITH ADJUSTABLE HARD DISK DRIVE AND INTERFACE CARD ACCOMMODATION SPACE

(75) Inventor: Wentai Lo, Taichung (TW)

(73) Assignee: Logic Concept Technology Co., Ltd., Taichung (TW)

( * ) Notice: Subject to any disclaimer, the term of this patent is extended or adjusted under 35 U.S.C. 154(b) by 186 days.

(21) Appl. No.: 12/777,622

(22) Filed: May 11, 2010

(65) Prior Publication Data
US 2011/0261521 A1 Oct. 27, 2011

(30) Foreign Application Priority Data

Apr. 22, 2010 (TW) ................................ 99207313 U

(51) Int. Cl.
*G06F 1/16* (2006.01)
(52) U.S. Cl. .................................................. 361/679.6
(58) Field of Classification Search ............... 361/679.6
See application file for complete search history.

(56) References Cited

U.S. PATENT DOCUMENTS

| 5,136,468 A * | 8/1992 | Wong et al. ............... 361/679.6 |
| 5,684,671 A * | 11/1997 | Hobbs et al. ............. 361/679.57 |
| 5,754,396 A * | 5/1998 | Felcman et al. ........... 361/679.6 |
| 5,816,673 A * | 10/1998 | Sauer et al. ................. 312/223.2 |
| 6,055,152 A * | 4/2000 | Felcman et al. ......... 361/679.39 |
| 6,097,591 A * | 8/2000 | Ircha .......................... 361/679.6 |
| 6,108,198 A * | 8/2000 | Lin ........................... 361/679.39 |
| 6,353,541 B1 * | 3/2002 | Leman et al. ................. 361/809 |

\* cited by examiner

*Primary Examiner* — Lisa Lea Edmonds
(74) *Attorney, Agent, or Firm* — Muncy, Geissler, Olds & Lowe, PLLC

(57) ABSTRACT

A computer case with adjustable hard disk drive and interface card accommodation space is provided. The computer case includes a frame, an optic disk drive rack, two fixed hard disk drive racks, and interface card slots into which interface cards may be plugged. A removable hard disk drive holder that carries hard disk drives is additionally arranged inside the computer case in a removable manner. By removing the removable hard disk drive holder, an open and unoccupied space is left inside the computer case to partly receive the interface cards that are plugged to the interface card slots. Thus, in an attempt to adopt high performance interface cards that are of a great size, the removable hard disk drive holder is removed and the unoccupied space so formed is turned into a space for partly accommodating the interface cards. In this way, flexible modification of the internal space of the computer case can be realized, to enable the computer case to selectively accommodate a computer that adopts high performance interface cards or a computer that requires a large storage space of multiple hard disk drives.

2 Claims, 8 Drawing Sheets

COMPUTER CASE WITH ADJUSTABLE HARD DISK DRIVE AND INTERFACE CARD ACCOMMODATION SPACE

BACKGROUND OF THE INVENTION

1. Field of the Invention

The present invention relates to the field of computer case, and in particular to a computer case that provides an adjustable accommodation space for hard disk drives and/or interface cards to fit the needs of both the computer performance fanatics and enterprises that use a large number of hard disk drives and to allow for mass production.

2. The Related Arts

Computers are now an indispensable utensil for daily living. With the progress of electronic performance, the consumers are no longer satisfied with the basic functions built in a main board of a computer. A variety of interface cards, including display card and sound card, are readily available from the market and can significantly improve the overall performance of a computer. However, the pursuit of performance upgrading leads to the structure of interface cards being complicated. A complicated circuit requires a size-expanded heat dissipation structure, which results in increase of the volume and length of the interface card. On the other hand, as shown in FIG. 1, a conventional computer case shows such an internal space arrangement that interface card slots 1 and a fixed hard disk drive rack 2 are arranged opposite to each other and a spacing distance (T) between the two is approximately 280 mm. A new version of high performance interface card 3 is often of a length (L) as long as 342 mm, which interferes with the fixed hard disk drive rack 2. A solution to handle this problem of interference is to expand the size of the computer case, but this would cause an increase of cost. Further, the bulkiness of the large size may not be acceptable to the general consumers. Thus, it is a challenge to the industry to find a solution that overcomes the problems but still suits the needs of various users.

Thus, it is desired to provide a novel structure of computer case that overcomes the above discussed problems and suits the needs of various consumers.

The present invention thus aims to provide a computer case with adjustable hard disk drive and interface card accommodation space in order to overcome the above discussed problems.

SUMMARY OF THE INVENTION

The technical problems that the present invention attempts to overcome is that a conventional computer case shows such an internal space arrangement that interface card slots and a fixed hard disk drive rack are arranged opposite to each other with a spacing distance (T) therebetween being approximately 280 mm, but a new version of high performance interface card is often of a length (L) as long as 342 mm, which interferes with the fixed hard disk drive rack. An apparent solution to handle this problem of interference by expanding the size of the computer case will cause an increase of cost and may lead to bulkiness of size that may not be acceptable to the general consumers. The purpose of the present invention is to provide a computer case that overcomes the problems and suits the needs of various consumers.

To solve such problems and drawbacks, the present invention provides a computer case that has an interior forming an internal accommodation space having a lengthwise dimension measured from a main board input/output (I/O) zone of the accommodation space in a direction toward a location where a main board is to be mounted. The lengthwise dimension of the internal accommodation space is within a range between a lower bound of being greater than or equal to 300 mm and an upper bound of being smaller than or equal to 480 mm. The computer case receives therein an optic disk drive rack, two fixed hard disk drive racks, and a plurality of interface card slots that receive interface cards to plug therein. A key arrangement of the computer case is that at least one removable hard disk drive holder is additional provided to install, in a removable manner, in the accommodation space. The removable hard disk drive holder, once removed, leaves an open and unoccupied space that corresponds to a direction along which the interface cards plugged in the interface card slots extend. As such, in an attempt to install high performance interface cards, which are of a greater size, the removable hard disk drive is removed to discard a mount of the space that originally accommodates hard disk drives for forming a space for accommodating the high performance interface cards of greater size. In this way, flexible modification of the internal space of the computer case is enabled to allow the computer case to selectively accommodate a computer adopting high performance interface cards or a computer requiring a large storage space of multiple hard disk drives.

The effectiveness of the present invention is as follows. For the conventional computer cases, the known computer cases having an internal space having a length between 300 mm and 480 mm can only receive regular interface cards that are of a small size to install therein and for an attempt to adopt high performance interface cards that are of a great size, an enlarged computer case must be used, but the bulkiness of size may not be accepted by the general consumers. Further, the costs of the computer case of enlarged size may be raised. On the other hand, the present invention provides a computer case of which an internal accommodation space is of great flexibility of modification to switch between hard disk drives and large-sized interface cards, so that the computer case provided by the present invention, with the same size of internal accommodation space having a length between 300 mm and 480 mm as that of the conventional computer cases, enables switching between hard disk drives and interface cards and thus the compute case of the present invention may selectively accommodate a computer adopting high performance interface cards or a computer requiring a large storage space of multiple hard disk drives. Further, this arrangement of the present invention enables mass production of the computer case to reduce the costs. Further, the arrangement of the present invention does not require expansion of the size of the computer case.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
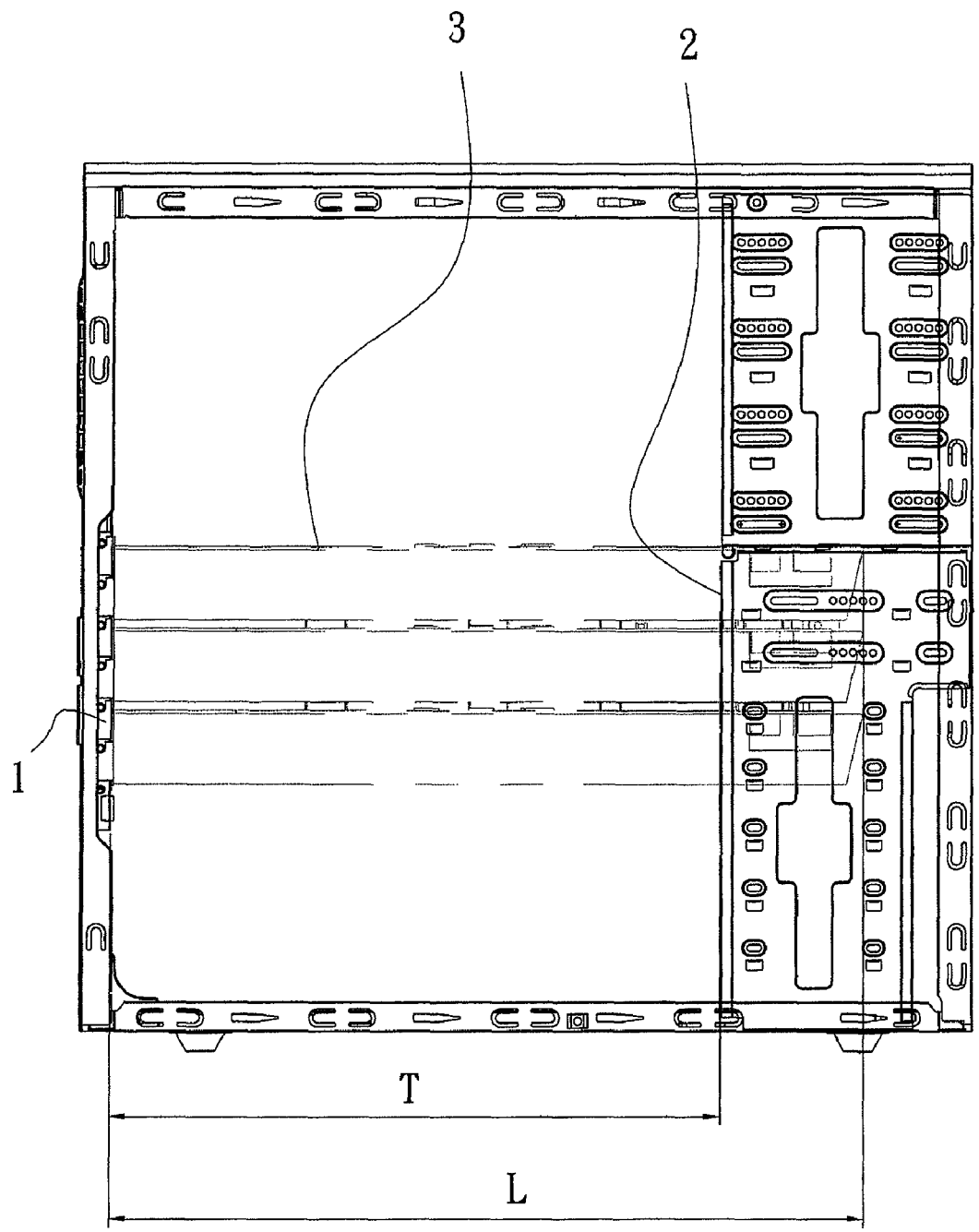
FIG. 1 is a side elevational view showing a conventional computer case.
Figure 2:
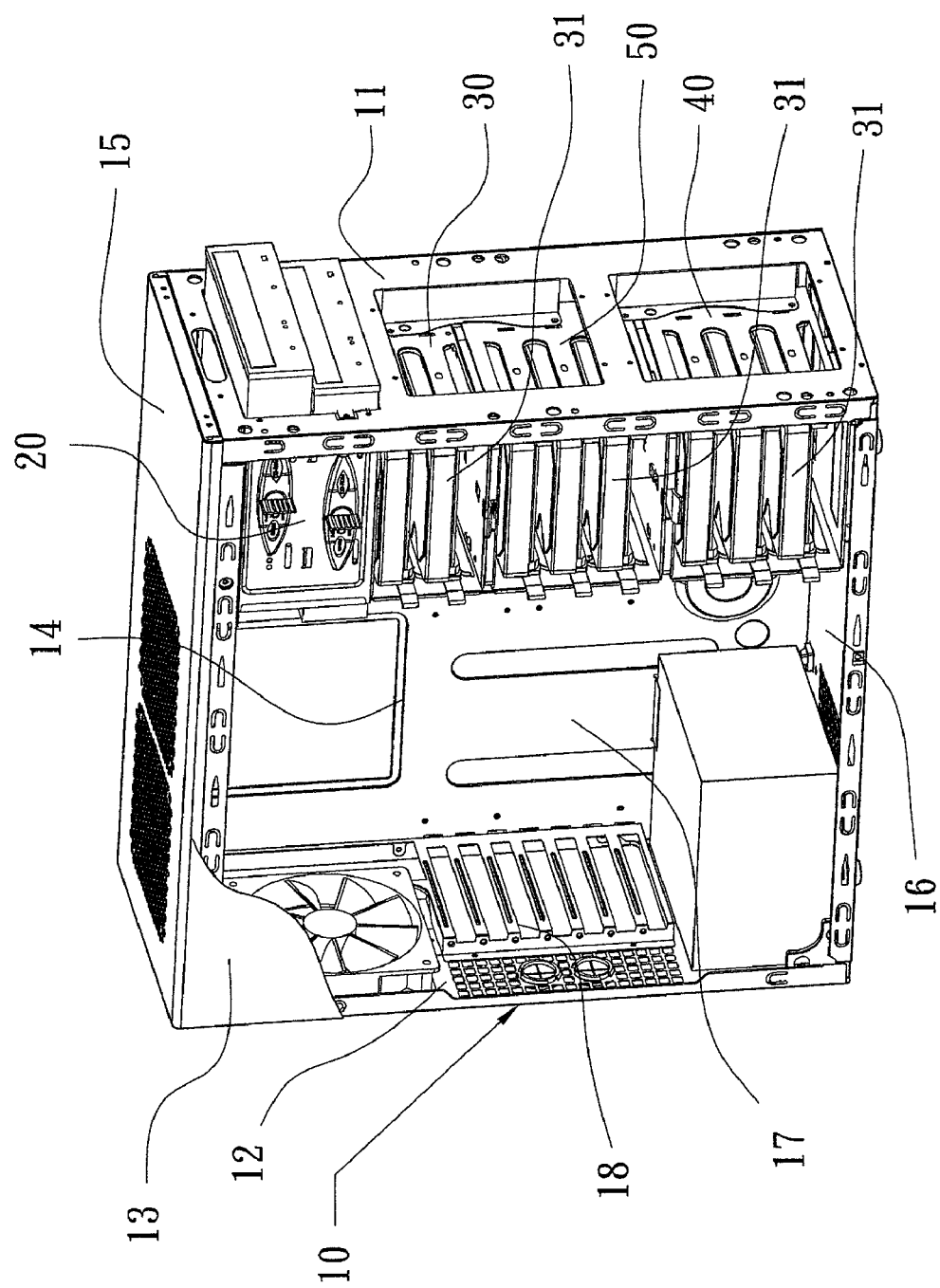
FIG. 2 is a perspective view showing a computer case constructed in accordance with an embodiment of the present invention.
Figure 3:
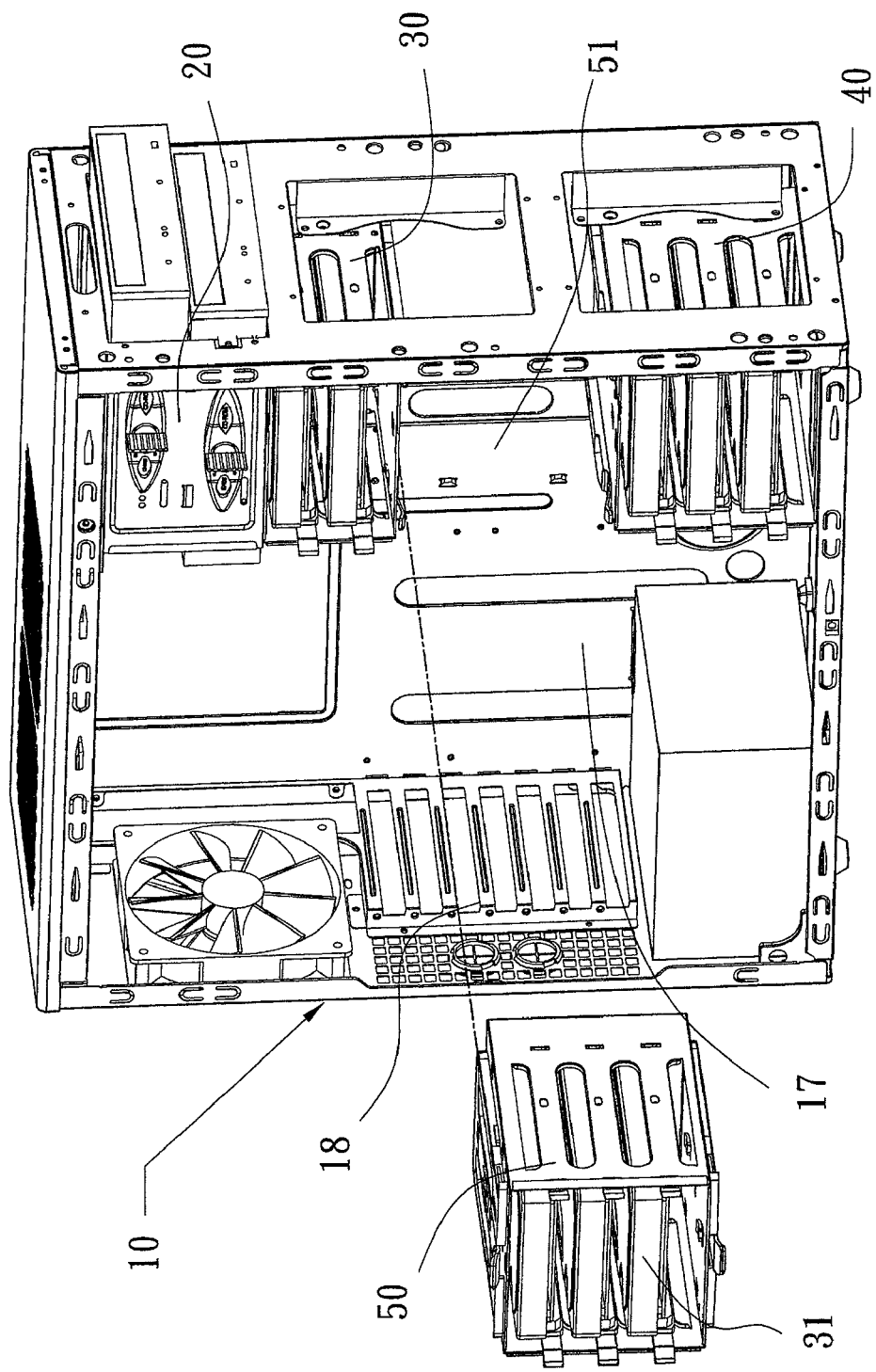
FIG. 3 is a perspective view of the computer case of the present invention, illustrating a removable hard disk drive holder removed out of the computer case.
Figure 4:
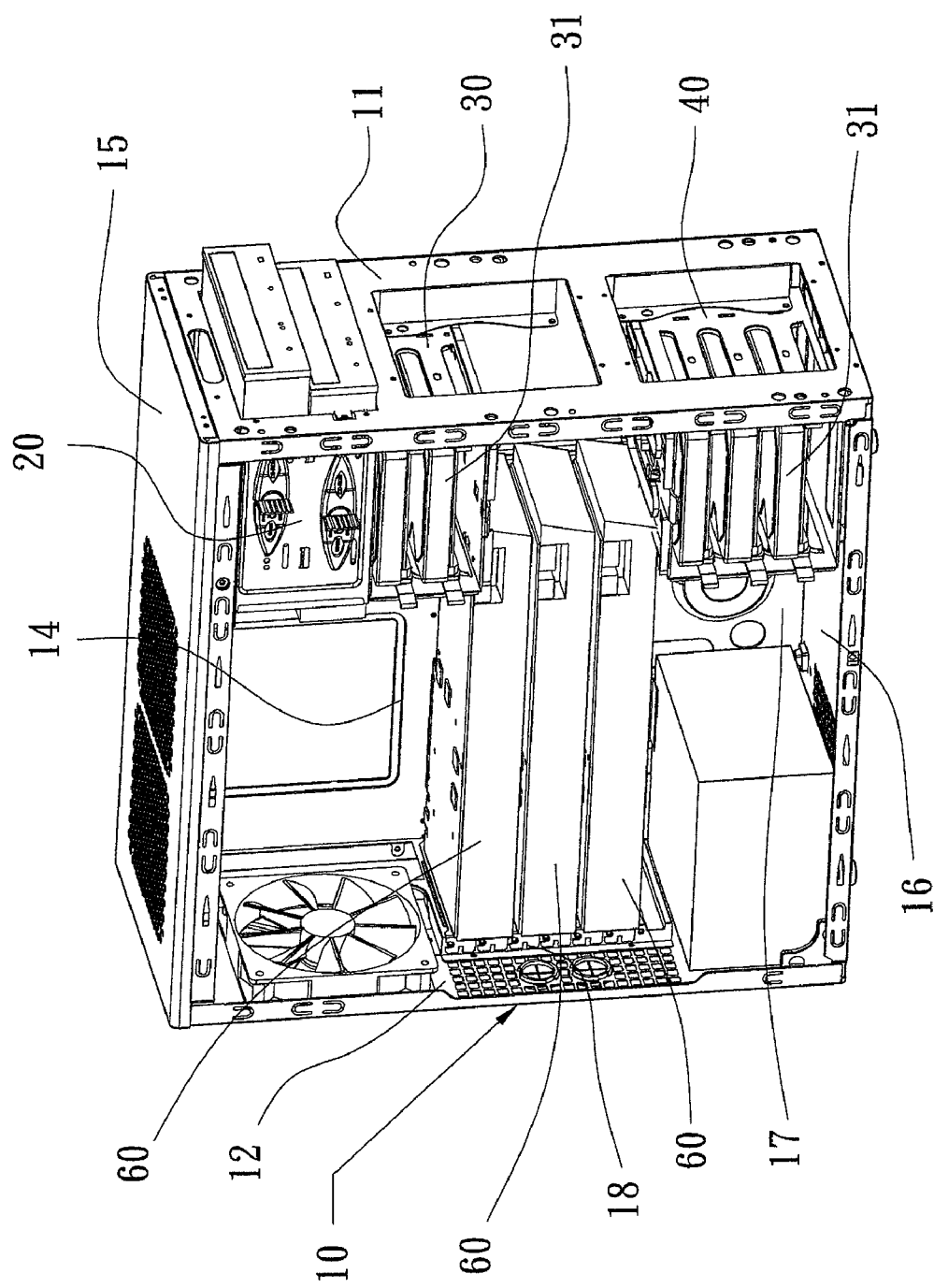
FIG. 4 is a perspective view of the computer case of the present invention, illustrating high performance interface cards installed in the computer case.
Figure 6:
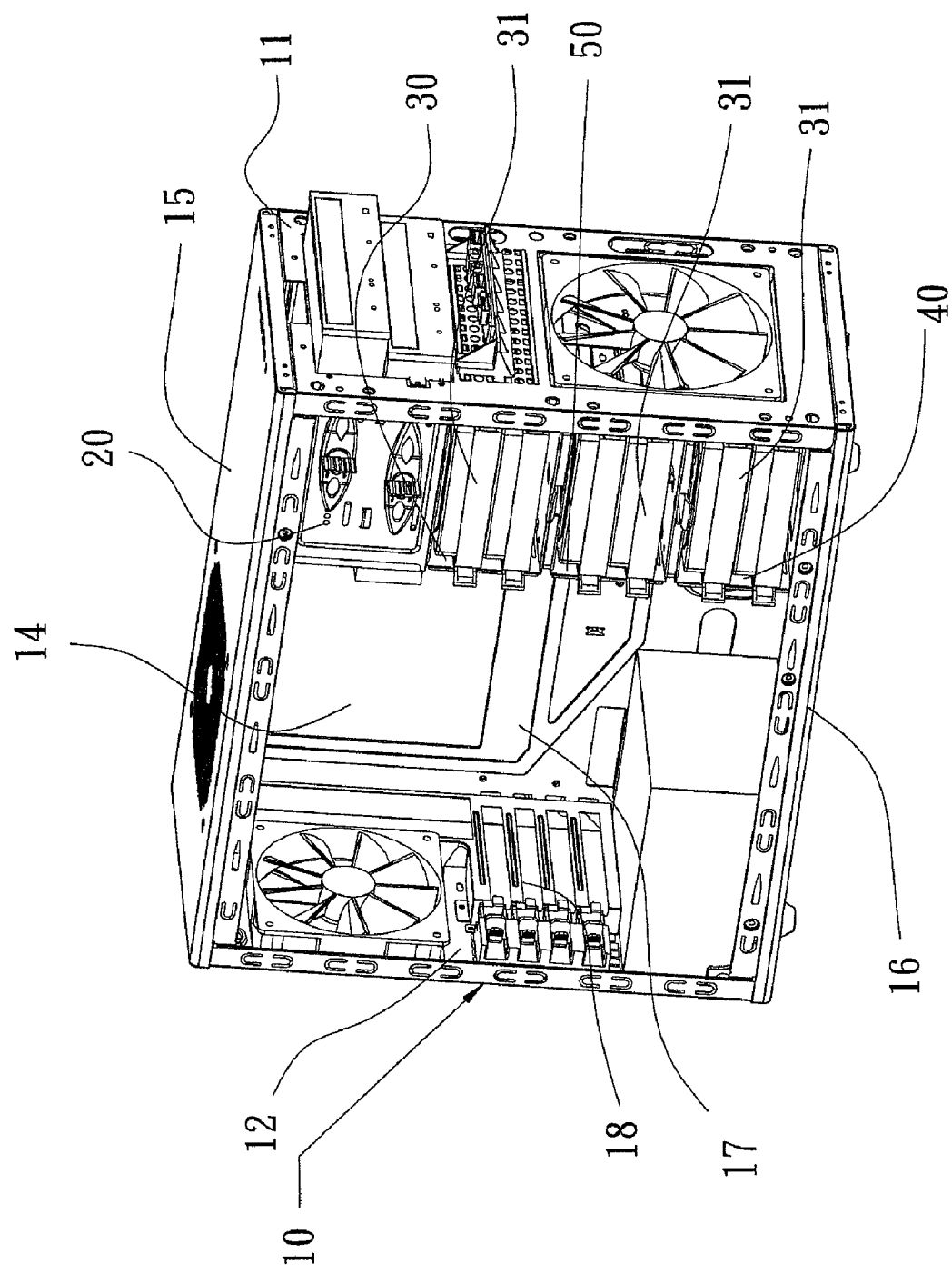
FIG. 6 is a perspective view showing a computer case constructed in accordance with another embodiment of the present invention.
Figure 7:
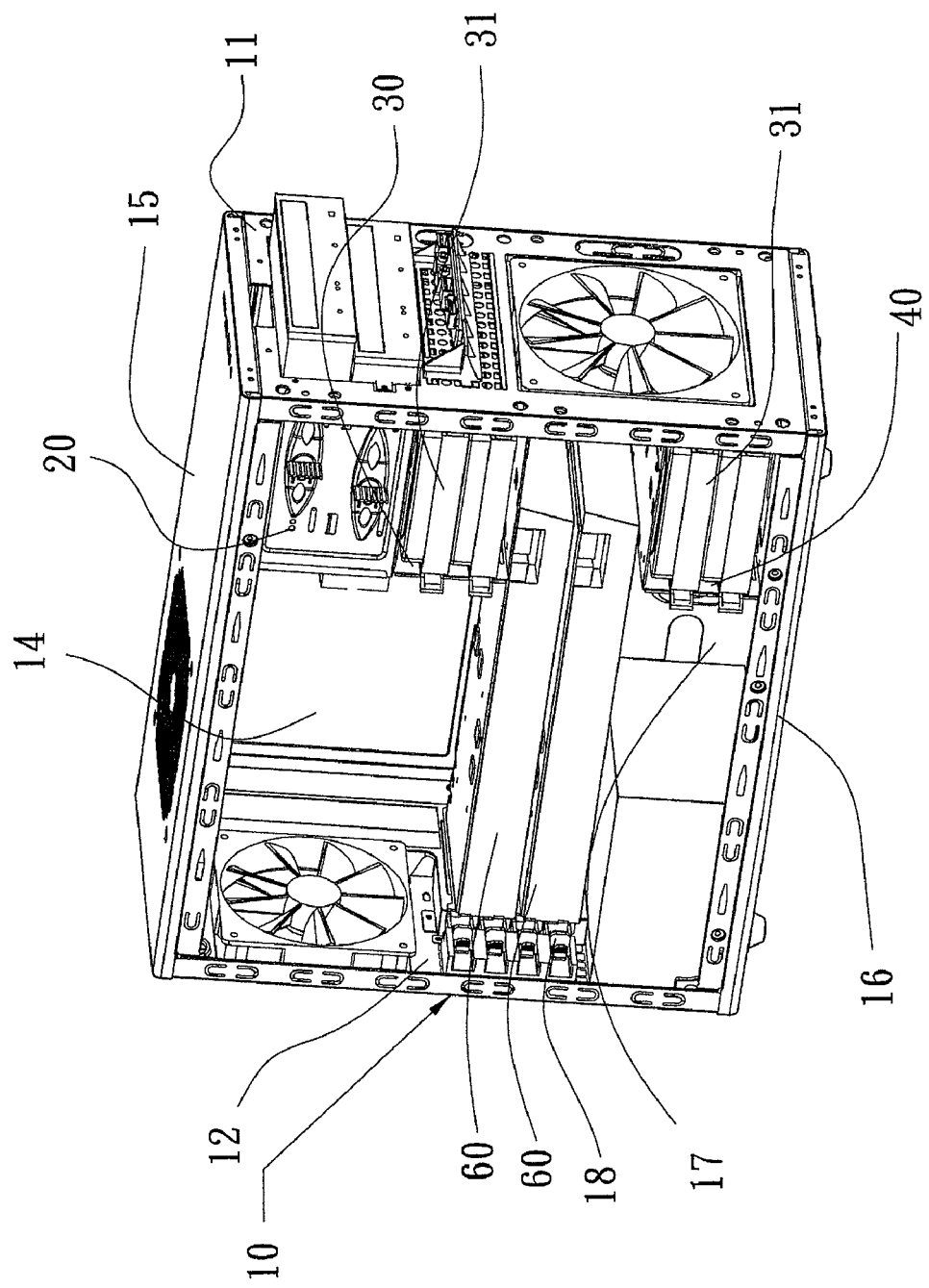
FIG. 7 is a perspective view of the computer case of the present invention, illustrating high performance interface cards installed in the computer case of said another embodiment of the present invention.

Reference is now made to FIGS. 2-4, which show an embodiment of high-profile computer case according to the present invention, and FIGS. 6 and 7, which show another embodiment of low-profile computer case according to the present invention, for both embodiments, the computer case of the present invention provides an internal space that is adjustable for selectively accommodating hard disk drives and/or interface cards.

Figure 8:
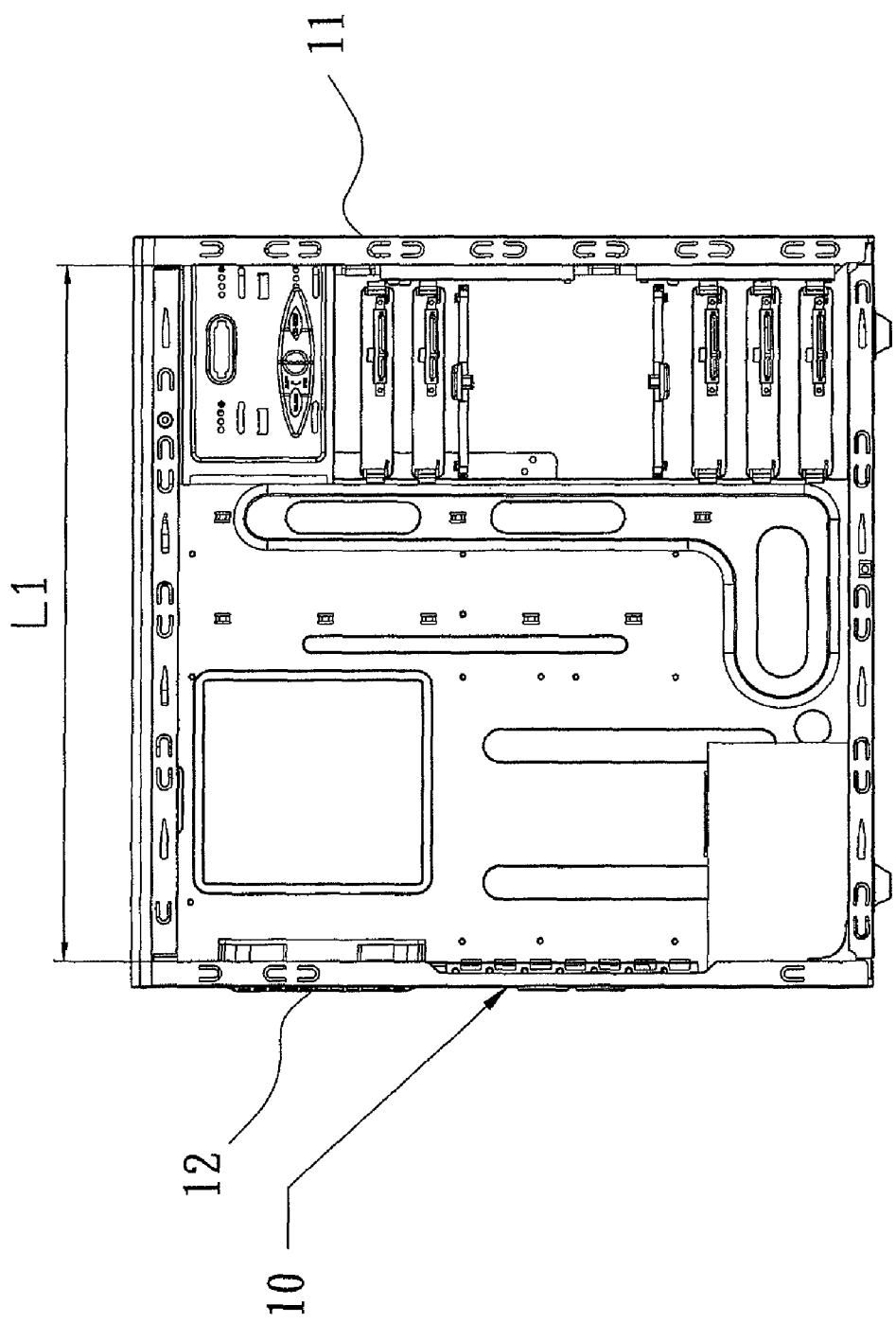
FIG. 8 is a side elevational view illustrating a computer case according to the present invention.

The computer case of the present invention comprises a frame 10, the interior of which forms an internal space having a lengthwise dimension or length (L1) measured from a main board input/output (I/O) zone in a direction toward a location where a main board (not shown) to be set (see FIG. 8). According to the present invention, the length (L1) of the internal space of the computer case is set within a range from a lower bound of being greater than or equal to 300 mm to an upper bound of being smaller than or equal to 480 mm. The frame 10 is composed of a front panel 11, a rear panel 12, a left panel 13, a right panel 14, a top panel 15, and a bottom panel 16, which together define an accommodation space 17, and also comprises a plurality of interface card slots 18, which are formed on the rear panel 12 of the frame 10.

An optic disk drive rack 20 is received in the accommodation space 17 at a location adjacent to the front panel 11. The optic disk drive rack 20 is mounted to a bottom surface of the top panel 15.

A first fixed hard disk drive rack 30 and a second fixed hard disk drive rack 40 are also contained in the accommodation space 17. The first fixed hard disk drive rack 30 is mounted to a bottom surface of the optic disk drive rack 20 inside the accommodation space 17. Each of the first and second fixed hard disk drive racks 30, 40 forms a plurality of chambers for respectively receiving and retaining hard disk drives 31. The second fixed hard disk drive rack 40 is mounted atop the bottom panel 16 inside the accommodation space 17 and is set in alignment with and substantially under the first fixed hard disk drive rack 30.

At least one removable hard disk drive holder 50 is arranged inside the frame 10 adjacent to the front panel 11 and substantially between the first and second fixed hard disk drive racks 30, 40. The removable hard disk drive holder 50 forms a plurality of chambers for respectively receiving and retaining hard disk drives 31. According to the present invention, the removable hard disk drive holder 50 is arranged at a location that exactly corresponds to a direction along which interface cards that are plugged into the interface card slots extend. When it is desired to install high performance interface cards 60, which has greater lengthwise dimension, the removable hard disk drive holder 50 is removed out of the frame 10, and by discarding certain spaces that accommodate the removed hard disks, the space that is originally occupied by the removable hard disk drive holder 50 is now left open and can be combined with other fractions of the internal space of the computer case to accommodate the long interface cards the accommodation space. In other words, an unoccupied space 51 is formed after the removable hard disk drive holder 50 is removed and such a space can accommodate additional length of the long interface cards 60. In this way, flexible modification of the interior of the frame 10 is readily realized, allowing the frame 10 to selectively accommodate a computer that adopts high performance interface cards or a computer that requires great storage space of multiple hard disk drives.

Figure 5:
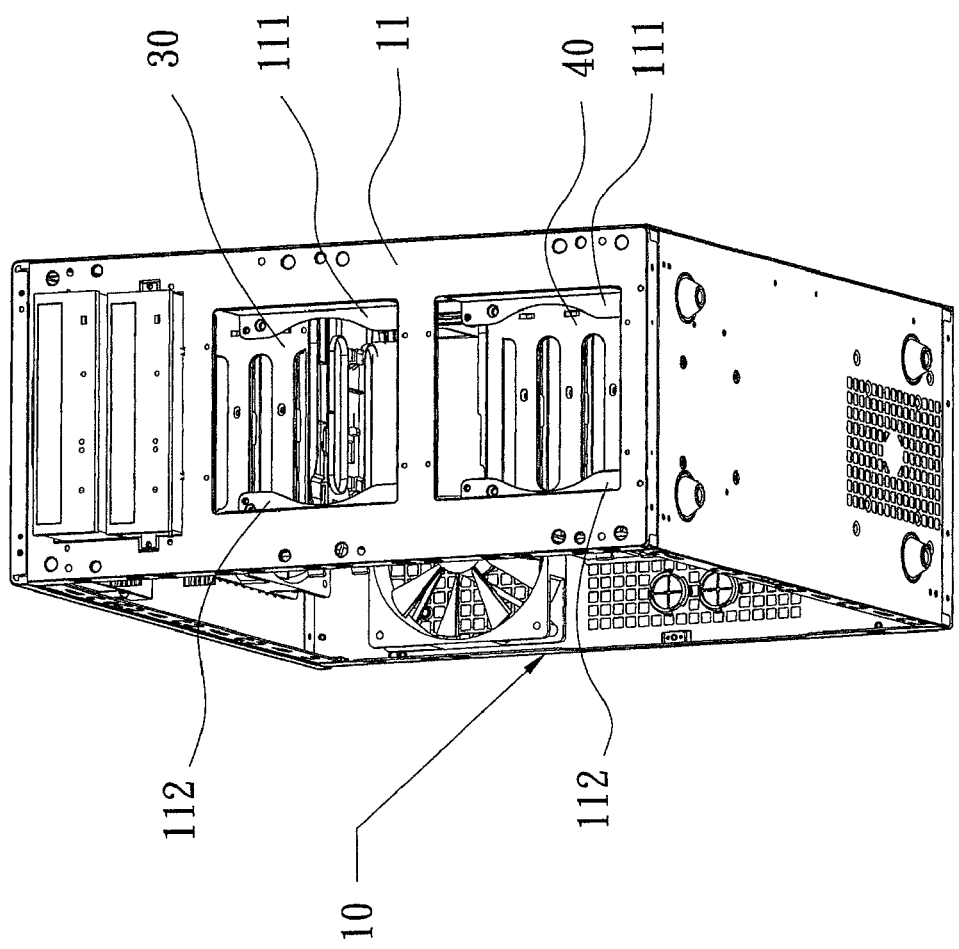
FIG. 5 is a perspective view of the computer case of the present invention, illustrating reinforcement of the computer case.

Referring to FIG. 5, the front panel 11 of the frame 10 is machined in such a way that two sets of L-shaped inward-bent flanges 111, 112 are stamped to extend toward the first fixed hard disk drive rack 30, the removable hard disk drive holder 50, and the second fixed hard disk drive rack 40. The L-shaped inward-bent flanges 111, 112 are set to overlap, at least partly, portions of the first fixed hard disk drive rack 30, the removable hard disk drive holder 50, and the second fixed hard disk drive rack 40 in order to reinforce and improve rigidity and structural strength of the frame 10.

In summary, for a computer case forming an internal accommodation space 17 that has a length between 300 mm and 480 mm, the feature of the present invention sought to be protected herein is that the accommodation space 17 receives therein a removable hard disk drive holder 50 that is removable out of the computer case and, after the removal of the removable hard disk drive holder 50, an open and unoccupied space 51 is formed at a location corresponding to the direction along which interface cards that are plugged to the interface card slots extend, whereby discarding of some hard disk accommodation space provides a space for interchangeably accommodate interface cards.

The present invention provides the following advantages:

(1) A novel structure of computer case that has adjustable accommodation space for hard disks and interface cards is provided, whereby when a computer case having an internal accommodation space having a length between 300 mm and 480 mm can be selectively modified or converted between a computer case accommodating a computer adopting high performance interface cards that are of a greater length than regular interface cards or a computer that requires a great storage space of multiple hard disk drives.

(2) With such a unique improved structure of switchable accommodations space for hard disk drives and interface cards that is provided specifically for a computer case having an internal accommodation space of which the length is between 300 mm and 480 mm, a removable hard disk drive holder is set up in a removable manner inside the computer case at a location exactly corresponding to a direction along which high performance interface cards that are of a greater dimension extends in the computer case, whereby in an attempt to adopt the high performance interface cards in the computer, the removable hard disk drive holder is removed and a portion of the space that originally accommodating hard disk drives (specifically that corresponding to the removable hard disk drive holder) is discarded and replaced by an open and unoccupied space that, when combined with other portions of the internal accommodation space of the computer case, is sufficient to accommodate the high performance interface cards that are of a greater dimension with the interface cards being partially received in the unoccupied space. The performance of a computer that includes the high performance interface cards in this way can be improved in the overall performance thereof.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A computer case with adjustable hard disk drive and interface card accommodation space, comprising:

a frame, which forms an internal space having a lengthwise dimension extending from a main board input/output zone toward a location where a main board is adapted to mount, the lengthwise length of the internal space being in a range having a lower bound of being greater than or equal to 300 mm and an upper bound of being smaller than or equal to 480 mm, the frame comprising a front panel, a rear panel, a left panel, a right panel, a top panel, and a bottom panel, which together define an accommodation space, and a plurality of interface card slots formed on the rear panel of the frame and adapted to receive interface cards to plug therein;

an optic disk drive rack, which is received in the accommodation space at a location adjacent to the front panel;

a first fixed hard disk drive rack and a second fixed hard disk drive rack, the first fixed hard disk drive rack being mounted to a bottom surface of the optic disk drive rack inside the accommodation space, the first and second fixed hard disk drive racks forming a plurality of chambers for respectively receiving and retaining hard disk drives, the second fixed hard disk drive rack being mounted atop the bottom panel inside the accommodation space and in alignment with and substantially under the first fixed hard disk drive rack; and at least one removable hard disk drive holder, which forms a plurality of chambers for respectively receiving and retaining hard disk drives, the removable hard disk drive holder being removably received inside the frame at a location adjacent to the front panel and corresponding to a direction along which the interface cards plugged in the interface card slots extend, whereby the removal of the removable hard disk driver holder out of the computer case forms an open and unoccupied space at a location corresponding to the extension direction of the interface cards and whereby the unoccupied space formed by removal of the removable hard disk drive holder enables formation of an interface card accommodation space, which partially receives excessive extension of the interface cards therein, by removing the removable hard disk drive holder out of the frame and thus discarding the space initially accommodating the removable hard disk drive holder, so that the frame allows for selective accommodation of a computer that adopts interface cards or a computer requiring a great storage space of multiple hard disk drives.

2. The computer case with adjustable hard disk drive and interface card accommodation space as claimed in claim 1, wherein the front panel of the frame forms a plurality of L-shaped inward-bent flanges that extend in a direction toward the first fixed hard disk drive rack, the removable hard disk drive holder, and the second fixed hard disk drive rack, the L-shaped inward-bent flanges being arranged to partly overlap the first fixed hard disk drive rack, the removable hard disk drive holder, and the second fixed hard disk drive rack for improving rigidity and structural strength of the frame.

* * * * *